United States Patent [19]
Kircher et al.

[11] Patent Number: 5,551,764
[45] Date of Patent: Sep. 3, 1996

[54] BRAKE SYSTEM FOR AUTOMOTIVE VEHICLES WITH ELECTRIC DRIVE

[75] Inventors: Dieter Kircher, Bad Vilbel-Dortelweil; Peter E. Rieth, Eltville; Karlheinz Bill, Dreieich; Juergen Balz, Wiesbaden; Lothar Kunze, Hofheiim-Langenhain; Georg Halasy-Wimmer, Eschborn, all of Germany

[73] Assignee: ITT Automotive Europe GmbH, Frankfurt, Germany

[21] Appl. No.: 403,651

[22] Filed: Mar. 14, 1995

Related U.S. Application Data

[62] Division of Ser. No. 157,742, Nov. 24, 1993, Pat. No. 5,421,643.

[30] Foreign Application Priority Data

Nov. 24, 1992 [DE] Germany ............... 42 39 386.8

[51] Int. Cl.⁶ .................... B60T 11/20; B60T 11/28; B60T 13/66; B60T 13/74
[52] U.S. Cl. .................... 303/3; 188/156; 303/20; 303/DIG. 3; 303/113.4
[58] Field of Search ............... 303/3, 6.01, 9, 303/119.2, 9.61, 14–20, 119.1, 113.4, DIG. 3, DIG. 4, 115.2, 114.1, 113.3, 113.2; 180/65.1, 65.3, 165, 305–308, 197; 188/156, 158, 159, 106 P, 355–360; 60/545, 565, 554; 364/426.01, 426.02, 424.01

[56] References Cited

U.S. PATENT DOCUMENTS

| | | |
|---|---|---|
| 3,171,505 | 3/1965 | Imelmann . |
| 3,536,361 | 10/1970 | Engle . |
| 3,621,929 | 11/1971 | Oberthur et al. . |
| 4,005,759 | 2/1977 | Farr . |
| 4,181,366 | 1/1980 | Dobner . |
| 4,270,806 | 6/1981 | Venkataperumal et al. . |
| 4,425,005 | 1/1984 | Warwick . |
| 4,591,016 | 5/1986 | Matthews . |
| 4,671,577 | 6/1987 | Woods . |
| 4,812,723 | 3/1989 | Shimizu ............... 60/545 |
| 4,828,332 | 5/1989 | Lohberg ............... 303/113.3 |
| 4,919,493 | 4/1990 | Leiber ............... 303/113.4 |

(List continued on next page.)

FOREIGN PATENT DOCUMENTS

| | | |
|---|---|---|
| 1905641 | 8/1970 | Germany . |
| 2112348 | 10/1971 | Germany . |
| 2545542 | 4/1976 | Germany . |
| 3124755 | 1/1983 | Germany . |
| 3342552 | 6/1985 | Germany . |
| 186755 | 10/1984 | Japan ............... 303/DIG. 3 |
| 0088673 | 5/1985 | Japan ............... 303/DIG. 3 |
| 1465613 | 2/1977 | United Kingdom . |
| 2076095 | 11/1981 | United Kingdom . |

OTHER PUBLICATIONS

A. Giorgetti et al., "Design of a Lightweight Braking System for Electric Cars," *SAE Paper 920649*, pp. 115–125, (Jan. 1992).

*Primary Examiner*—Douglas C. Butler
*Attorney, Agent, or Firm*—Ratner & Prestia

[57] ABSTRACT

A brake system for automotive vehicles with electric drive is operable by an actuating pedal and uses hydraulic friction brakes to augment the braking effect generated by the electric drive motors. The coaction of the drive motors with the hydraulic friction brakes is controlled by an electronic controller. In order to largely conform the pedal characteristics of the mentioned brake system to that of a standard passenger car, an actuating pedal (5) is in force-transmitting and travel-transmitting connection with a spring (8) exhibiting a predetermined characteristic curve, and the master brake cylinder (11), uncoupled from the actuating pedal (5), is operable by an electromagnet (9) which is responsive to the controller (70). If the master brake cylinder accommodates two pressure cheers, a single valve is arranged in or on the master cylinder housing, and acts as both a bypass valve and a differential-pressure valve.

50 Claims, 5 Drawing Sheets

U.S. PATENT DOCUMENTS

| | | | |
|---|---|---|---|
| 4,919,496 | 4/1990 | Burgdorf et al. | 303/113.4 |
| 4,962,969 | 10/1990 | Davis . | |
| 5,000,525 | 3/1991 | Reinartz et al. | 303/113.4 |
| 5,094,079 | 3/1992 | Leigh-Monstevens et al. | 60/545 |
| 5,123,717 | 6/1992 | Willmann | 303/113.4 |
| 5,178,441 | 1/1993 | Heibel et al. | 303/113.4 |
| 5,236,257 | 8/1993 | Monzaki et al. | 303/115.2 |
| 5,253,929 | 10/1993 | Ohori . | |
| 5,294,191 | 3/1994 | Giorgetti et al. . | |
| 5,312,167 | 5/1994 | Giorgetti et al. . | |
| 5,318,355 | 6/1994 | Asanuma et al. . | |
| 5,350,224 | 9/1994 | Nell et al. | 303/113.4 |
| 5,378,053 | 1/1995 | Patient et al. | 303/3 |

BRAKE SYSTEM FOR AUTOMOTIVE VEHICLES WITH ELECTRIC DRIVE

This application is a division of application Ser. No. 08/157,742, filed Nov. 24, 1993, now U.S. Pat. No. 5,421,643.

BACKGROUND OF THE INVENTION

The present invention relates to a brake system for automotive vehicles with electric drive. In particular, the present invention relates to a brake system which is operable by an actuating pedal and includes at least one electric drive motor as well as hydraulic friction brakes which are connected to a master brake cylinder. Such brake systems also include a device for determining the pressure prevailing in the master brake cylinder, an electronic controller to which the output signal of a sensor determining the actuating condition of the actuating pedal is fed, and a control device controlling the electric drive motor(s).

A brake system of this kind is described in the article "Design of a Lightweight Braking System for Electric Cars" (SAE-paper 920649 of January 1992). In this system, the hydraulic friction brakes are connected to the corresponding pressure chambers of the master brake cylinder via the intermediary of valve assemblies which are each formed by an electromagnetically operable bypass valve as well as by a differential-pressure control valve which is operable by the pressure prevailing in the hydraulic pressure chamber of the master cylinder. The two valves, preferably, are connected in parallel. Electromagnets, which actuate the bypass valves, are driven by the control devices which control the electric drive motors.

The pedal characteristics of this known system are considered disadvantageous. These pedal characteristics conform only very imperfectly to the pedal characteristics of a standard passenger car and exhibit a broad hysteresis and two portions of different gradients resulting in a discontinuous pedal feeling. Further, the known brake system cannot take into account the varying retarding power of the electric drive motors. Also, the separate mounting of the master brake cylinder and the valve assemblies requires considerable space.

SUMMARY OF THE INVENTION

The present invention is directed to a brake system of the type initially referred to whose pedal characteristics correspond largely to that of a standard passenger car. At the same time, the pedal characteristics exhibit a narrow hysteresis and a continuous variation so that a pleasant pedal feeling is imparted to the driver. Finally, the brake system of the present invention is able at any time to react to the varying retarding power of the electric drive motors. In addition, it permits a space-saving assembly by using individual parts which lend themselves to low-cost manufacture.

According to a first embodiment of the present invention, the actuating pedal is in force-transmitting and travel-transmitting connection with a spring having a predetermined characteristic curve, and the master brake cylinder, uncoupled from the actuating pedal until the actuating pedal has traveled a threshold distance, is operable by an electromagnet responsive to the controller.

A design of the subject matter of this invention permits manufacture at especially low costs. According to this design, an actuating rod is articulated at the actuating pedal and the actuating rod carries a plate on which the spring is supported.

According to a preferred embodiment of the present invention, the spring is arranged such that it can be uncoupled from the actuating pedal in terms of effect. In this embodiment, the actuating rod carries a plate that cooperates with a second electromagnet which is drivable on actuation and on which the spring takes support. Owing to these provisions, an advantageous reduction of the actuating force in the event of error detection or power failure is achieved. The second electromagnet can be driven either by the controller or by a brake light switch responsive to the actuating pedal.

In order to achieve a sufficient braking effect upon power failure, it is provided in another embodiment of the present invention that the plate is movable into engagement with a piston rod, after the actuating pedal has travelled a threshold distance, to actuate the master cylinder piston.

In a particularly compact design variant of the actuating unit according to the present invention, the electromagnet is arranged coaxially to the master brake cylinder such that its armature embraces the piston rod radially and is axially abutting on a collar of larger diameter provided on the piston rod.

A reliable abutment of the plate on the second electromagnet is achieved according to another inventive feature by a second spring interposed between the armature of the first electromagnet (solenoid) and the plate.

A particularly effective coupling or locking between the spring and the actuating pedal is achieved in another design of the present invention. In this design, the electromagnet is arranged so as to be axially slidable within limits and cooperates with a hydraulic piston which confines a hydraulic cheer, the connection of which with the pressure fluid supply reservoir can be shut off on actuation. Also, in this design, the spring is supported on the electromagnet. Preferably, the piston is designed as an annular piston and bounds the chamber designed as an annular chamber in a flange adapted to be fitted preferably to a body wall of the automotive vehicle. A valve, preferably open in its de-energized state, shuts off the annular chamber from the pressure fluid supply reservoir and responds to the controller or to a brake light switch cooperating with the actuating pedal. A brake system of this design can divide the driver's demand for deceleration among the electric drive motors operating in the braking mode and the hydraulic friction brakes without adversely affecting the reaction force on the pedal.

In a weight-optimized actuating unit of the brake system according to the present invention, the master cylinder housing is made of plastics and is designed integrally with the pressure fluid supply reservoir.

Minimizing the number of possible leakages is achieved in another preferred embodiment of the present invention. In this embodiment, the connection between the annular chamber and the pressure fluid supply reservoir is formed by two bores provided in the flange as well as by a tubular pressure fluid duct which is shaped at the pressure fluid supply reservoir and connects to one of the bores.

According to another design which has short overall dimensions particularly in the front part of the automotive vehicle, in which usually the batteries are accommodated, the master brake cylinder is coupled to the flange by the intermediary of the automobile body wall. It is expedient that the flange and the electromagnet form an assembly unit which carries the controller.

According to a design variant of the present invention which can be manufactured at low costs, the master cylinder piston is designed as a plunger piston and is slidably guided in a sliding guide arranged in the master cylinder housing.

These provisions permit the use of plastic pistons which have a shape such that expensive compensating bores (so-called breathering holes) can be avoided.

A further cost reduction results in another design of the subject matter of this invention in which the sliding guide serves as an axial stop for the master cylinder piston and as an abutment surface for a resetting spring biassing the master cylinder piston. In this arrangement, the sliding guide is designed as a sleeve provided with an external thread which is screwed into the master cylinder housing. Manufacturing advantages are achieved by these provisions.

A mechanical intervention upon rupture of the spring cooperating with the actuating pedal is ensured in another preferred embodiment of this invention by the actuating rod being movable into engagement with a piston rod that actuates the master cylinder piston, after the actuating rod has traveled a threshold distance.

Finally, in order to augment the operational reliability of the brake system according to this invention, a device is provided for sensing the switch condition of the valve between the pressure fluid supply reservoir and the annular chamber. Preferably, this valve is designed as a solenoid valve, and the device senses variations of the inductivity of its coil which are caused by variations of the switch conditions of the valve.

It is expedient in dual-circuit brake systems that the master brake cylinder is designed as a tandem master cylinder.

In further preferred embodiments of the present invention, the device for sensing the pressure prevailing in the master brake cylinder is a pressure sensor or a magnetic field sensor for sensing the magnetic field of the electromagnet actuating the master brake cylinder. The use of a magnetic field sensor is especially favorable since no intervention in the hydraulics is necessary.

According to another embodiment of the present invention for a master brake cylinder accommodating a first pressure chamber and a second pressure chamber, a pressure sensor is connected to the first pressure chamber which serves to sense the actuating force or to actuate the control device controlling the electric drive motor(s). A valve assembly composed of a bypass valve and a differential-pressure valve is connected to the second pressure chamber and has its outlet connect to the hydraulic friction brakes. This valve assembly is arranged in the master cylinder housing and is composed of one single valve. This arrangement serves to obtain a particular compact design of the actuating unit which permits to economize connecting lines and, simultaneously, to reduce the number of possible leakages.

Preferably, the single valve which acts as both a bypass valve and a differential pressure control valve is formed by a sealing seat closable by a closing member (e.g. a ball) and provided in a piston which is slidable within limits and to which the hydraulic pressure prevailing in the second pressure chamber is applicable. The closing member cooperates with an electromagnetically slidable tappet whose position determines the position of the piston and hence the zero point of the operating range of the pressure control phase.

A simple machining of the master cylinder housing is achieved in a preferred embodiment of the invention in that the valve assembly is symmetrical in the rotational direction and is arranged at the end of the master cylinder housing such that its axis of symmetry is identical with the master cylinder's longitudinal axis.

In order to shorten the overall axial length of the actuating unit, the valve assembly is symmetrical in the rotational direction and is arranged at the end of the master cylinder housing such that its axis of symmetry together with the master cylinder's longitudinal axis encloses an angle from 0° to 90°.

In another embodiment of the present invention, a fail-safe position of the valve assembly in which in the event of power failure a connection is safeguarded. This connection is between the second pressure chamber of the master brake cylinder and the hydraulic friction brakes and is kept open by the tappet being preloaded by a compression spring in the opening direction of the valve assembly. Thus, a pressure build-up in the hydraulic brakes is still possible in the event of a power failure.

It is also preferred that the tappet is coupled to the armature of an electromagnet by a force-transmitting connection and is guided in a blind-end bore formed in the housing of the electromagnet. The length of the bore is sized slightly larger than the actuating stroke of the tappet. It is ensured thereby that an emergency stop is available for the tappet if the armature is improperly attached to the tappet.

According to another preferred embodiment of the present invention, the electromagnet is designed as a proportional magnet. The possibility of varying the zero point of the operating range of the pressure control phase individually results therefrom.

The master cylinder piston confining the second pressure chamber should be movable into force-transmitting connection with the piston. With this arrangement, an exploitable pedal travel proportional to pedal force on the occurrence of hydraulic failure of the second pressure chamber is propagated to the hydraulic friction brakes, instead of being taken up by the pressurization of the second pressure chamber. The transmission of force is effected preferably by a cylindrical sleeve axially abutting on the second master cylinder piston.

A travel simulator function is realized upon failure of the second pressure chamber by one end of the piston abutting on a cup spring assembly supported on the housing of the electromagnet and by the other end of the piston formed on a stop with the master cylinder housing. The housing of the electromagnet is provided as an axial stop for the piston.

Finally, an enhanced operating reliability of the brake system according to the present invention is achieved by the hydraulic pressure prevailing in the first pressure chamber serving exclusively to actuate the pressure sensor so that the braking effect of the electric drive motors is safeguarded without the influence of the hydraulic friction brakes.

BRIEF DESCRIPTION OF THE DRAWINGS

Further details of the present invention can be taken from the following description of two embodiments with reference to the accompanying drawings in which like reference numerals designate corresponding individual parts. In the drawings.

DETAILED DESCRIPTION OF THE INVENTION

Figure 1:
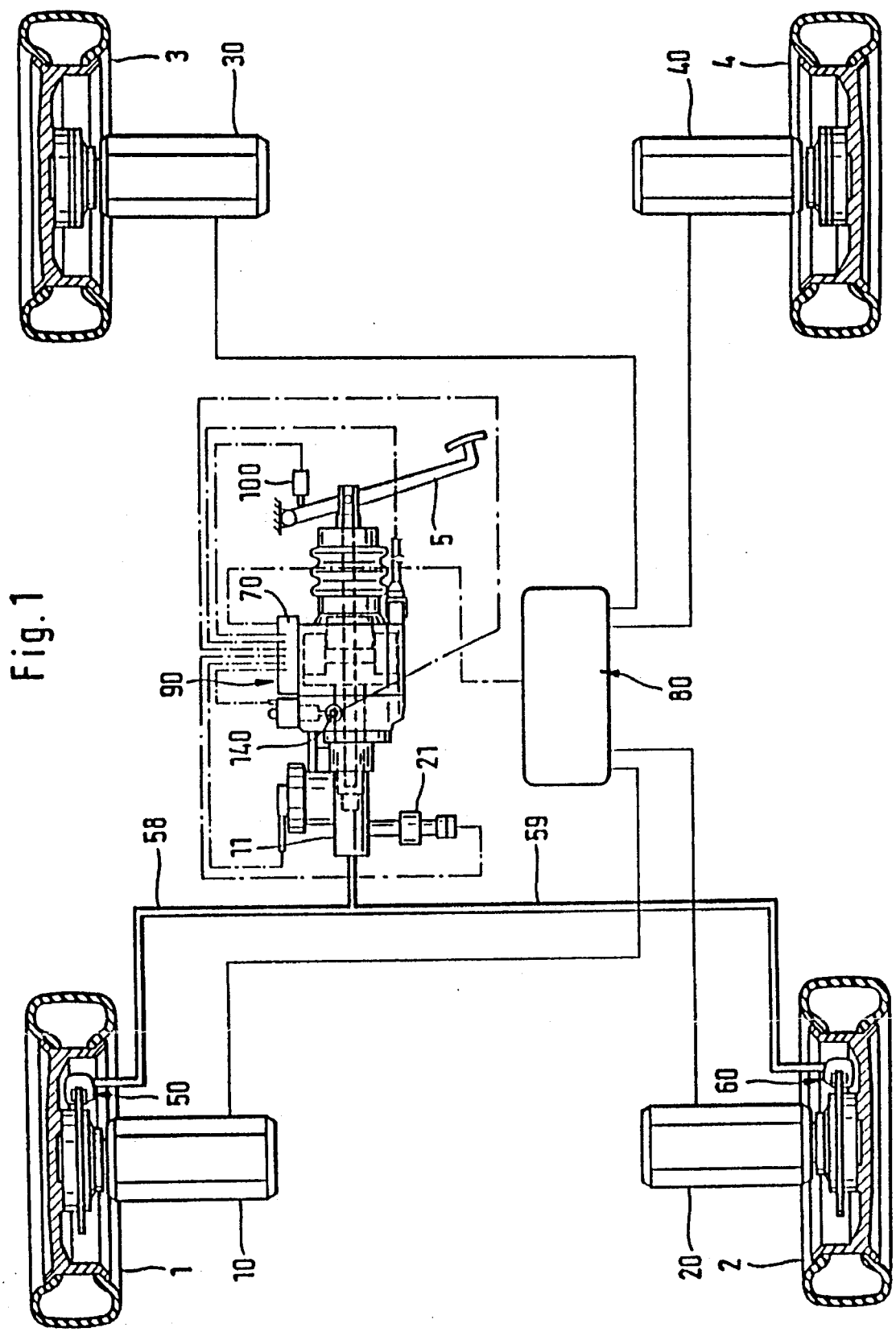
FIG. 1 is a simplified schematic view of a first embodiment of the brake system according to the present invention.
Figure 2:
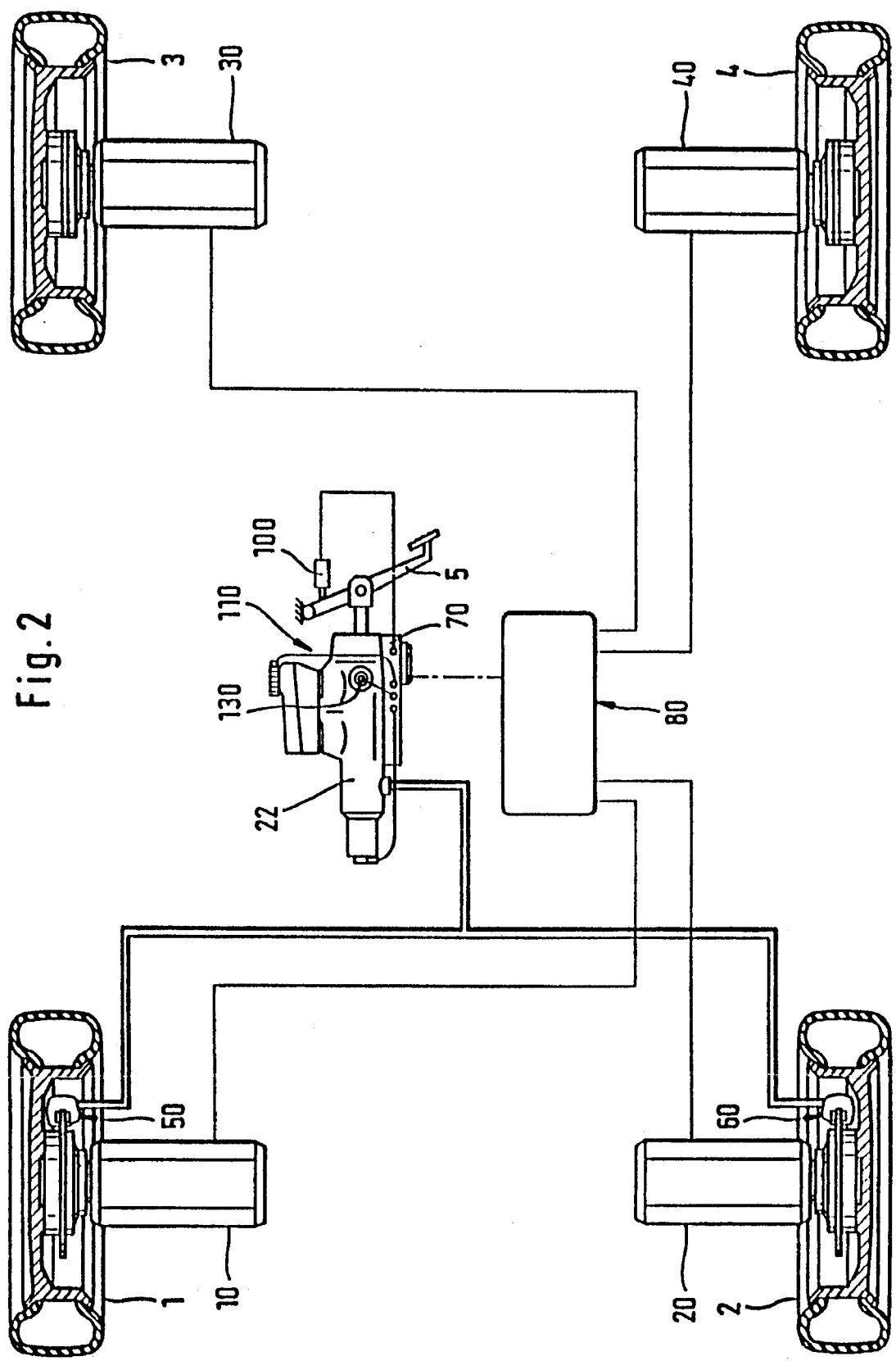
FIG. 2 is a simplified schematic view of a second embodiment of the brake system according to the present invention.

As shown in FIGS. 1 and 2, the brake system according to the present invention is composed of an actuating unit 90, 110 operable by an actuating pedal 5 and a master brake cylinder 11, 22 to which, via hydraulic lines 58, 59, hydraulic friction brakes 50, 60 are connected. Hydraulic friction brakes 50, 60 are allocated to the wheels 1, 2 of a vehicle axle, for instance the front axle. The wheels 1, 2 equipped with the hydraulic friction brakes 50, 60 are driven by electric drive motors 10, 20, while the wheels 3, 4 of the other vehicle axle are driven by electric drive motors 30, 40. The electric drive motors 10, 20, 30, 40 can also be used for braking the vehicle and are connected to a control device 80 for this purpose. Control device 80 is fed with control signals of an electronic controller 70 which, in response to the driver's desire to decelerate, controls the coaction of the hydraulic friction brakes 50, 60 with the electric drive motors 10, 20, 30, 40 to brake the vehicle. This braking action is dependent on output signals (e.g. actuating pedal position signals) of a brake light switch 100 operable by the actuating pedal 5 and on output signals of a pressure sensor 140 (FIG. 1) or 130 (FIG. 2) which senses a hydraulic pressure corresponding to the driver's desire or, respectively, a pressure prevailing in the master brake cylinder.

Figure 3:
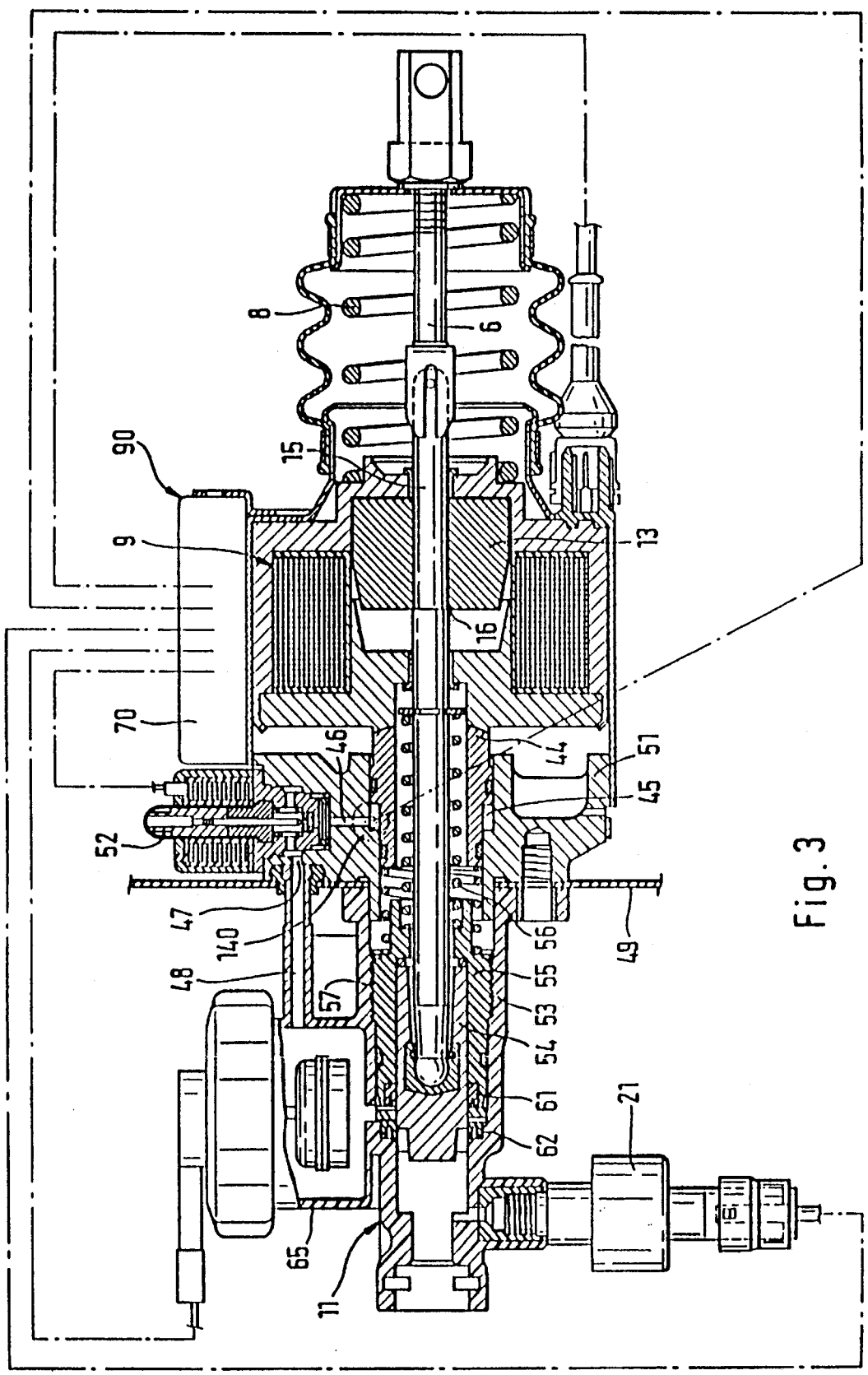
FIG. 3 is a partial cross-sectional view on an enlarged scale of the actuating unit of the brake system shown in FIG. 1.

The actuating unit 90 used on the inventive brake system according to FIG. 1 is illustrated on an enlarged scale in FIG. 3 which shows master cylinder 11 having master cylinder piston 54 which is operable by a piston rod 15. The master cylinder piston 54 configured as a plunger piston is slidably guided preferably in a sliding guide 55 formed by a plastic sleeve which, provided with an external thread 57, is screwed into the master cylinder housing 53, which also is made of plastics. Each sealing sleeve 61 and 62 arranged in the sliding guide 55 or, respectively, in the master cylinder housing 53, effect the sealing of the master cylinder piston 54 in relation to the sliding guide 55 as well as in relation to a pressure fluid supply reservoir 65 shaped integrally with the master cylinder housing 53. A resetting spring 56, preloading the master cylinder piston 54 in the direction opposite to the actuating direction, takes support on the sliding guide 55 which forms an axial stop for the master cylinder piston 54.

When the actuating unit is attached in the vehicle or to an automobile body wall 49, the master cylinder housing 53 is screwed to a flange 51, and the automobile body wall 49 is clamped in between master cylinder 11 and flange 51. Flange 51 forms an assembly unit together with an electromagnet 9 which is arranged so as to be slidable or movable within limits relative to the master brake cylinder 11, preferably in a coaxial direction, and serves to guide an annular piston 44 which is in force-transmitting connection with the electromagnet 9. The annular piston 44 confines in the flange 51 a hydraulic cheer 45, which is connected to a pressure fluid supply reservoir 65. This connection is closable by means of a valve 52, e.g. a solenoid valve, open in its de-energized condition. The previously mentioned connection consists of two bores 46, 47 provided in the flange 51, preferably disposed perpendicularly to each other, with the point of intersection being the valve seat of the valve 52 and of a tubular pressure fluid duct 48 which is shaped as one-piece on the pressure fluid supply reservoir 65 and which connects to the horizontally extending bore 47.

In order to permit an actuation of the master brake cylinder 11 by the electromagnet 9 when the actuating pedal 5 is uncoupled from the piston rod 15, the piston rod 15 is provided with an annular collar 16 of larger diameter on which the armature 13 of the electromagnet 9 is in axial abutment. Armature 13 is movable in response to energization of electromagnet 9.

In the event that the braking effect requirement can be met alone by the electric drive motors 10, 20, 30, 40 (FIGS. 1, 2) operating in the braking mode, a corresponding pedal feeling must be imparted to the driver of the vehicle. For this purpose, a spring 8 interposed in terms of effect between the actuating pedal 5 and the electromagnet 9 is provided. Spring 8 has a predetermined characteristic curve which simulates the reaction force caused during hydraulic braking operation.

In order to transmit the actuating force introduced at the actuating pedal 5 to the master cylinder piston 54 in the event of rupture of the simulator spring 8, piston rod 15 can be brought into engagement with an actuating rod 6 which is coupled to and movable in response to the actuating pedal 5, after pedal 5 has traveled a threshold distance. Further, it is expedient that the controller 70 is carried by the assembly unit consisting of flange 51 and electromagnet 9 so that it is placed in the passenger compartment in the illustrated arrangement where it is protected against corrosion influences, such as splashwater and battery chamber atmosphere.

Once a braking operation is started by depression of the actuating pedal 5 and when only 30% of the total braking effect is required which can be generated alone by the electric drive motors 10 to 40, the actuating condition of the actuating pedal 5 is recognized both by the brake light switch 100 and by the pressure sensor 140 sensing the hydraulic pressure in the annular cheer 45. The controller 70 responds to the signals delivered by brake light 100 and pressure sensor 140 indicating this actuating condition and delivers a control signal to the control device 80. The control device 80 causes switch-over of the electric drive motors 10 to 40 into the braking mode, so that they can carry out deceleration of the wheels 1 to 4. Simultaneously, a second control signal of the controller 70 causes the valve 52 to switch over so that the connection 46 to 48 between the annular cheer 45 and the pressure fluid supply reservoir 65 is interrupted and the annular chamber 45 is hydraulically isolated.

Also, the electromagnet 9 is locked in its initial position by closing of the annular chamber 45 so that the actuating force is transmitted via the simulator spring 8 and the electromagnet 9 to the annular piston 44, and an increase in pressure takes place in the annular chamber 45 which is sensed by way of a pressure sensor 140. Once the pressure sensor 140 indicates that a greater braking effect is desired by the driver than is generated by the drive motors, the controller 70 will produce control signals which have as a result energization of the electromagnet 9. With this energization, the armature 13 of electromagnet 9, by way of the piston rod 15, causes displacement of the master cylinder piston 54 and thus pressure build-up in the hydraulic friction brakes 50, 60 connected to the master cylinder 11. In this braking mode, the connection 46 to 48 remains open in the event of power failure so that the pressure fluid volume enclosed in the annular chamber 45 is displaced into the pressure fluid supply reservoir 65 by shifting of the parts 6, 8, 9, 13, 44, and the hydraulic friction brakes 50, 60 are actuated by the displacement of the master cylinder piston 54.

Figure 4:
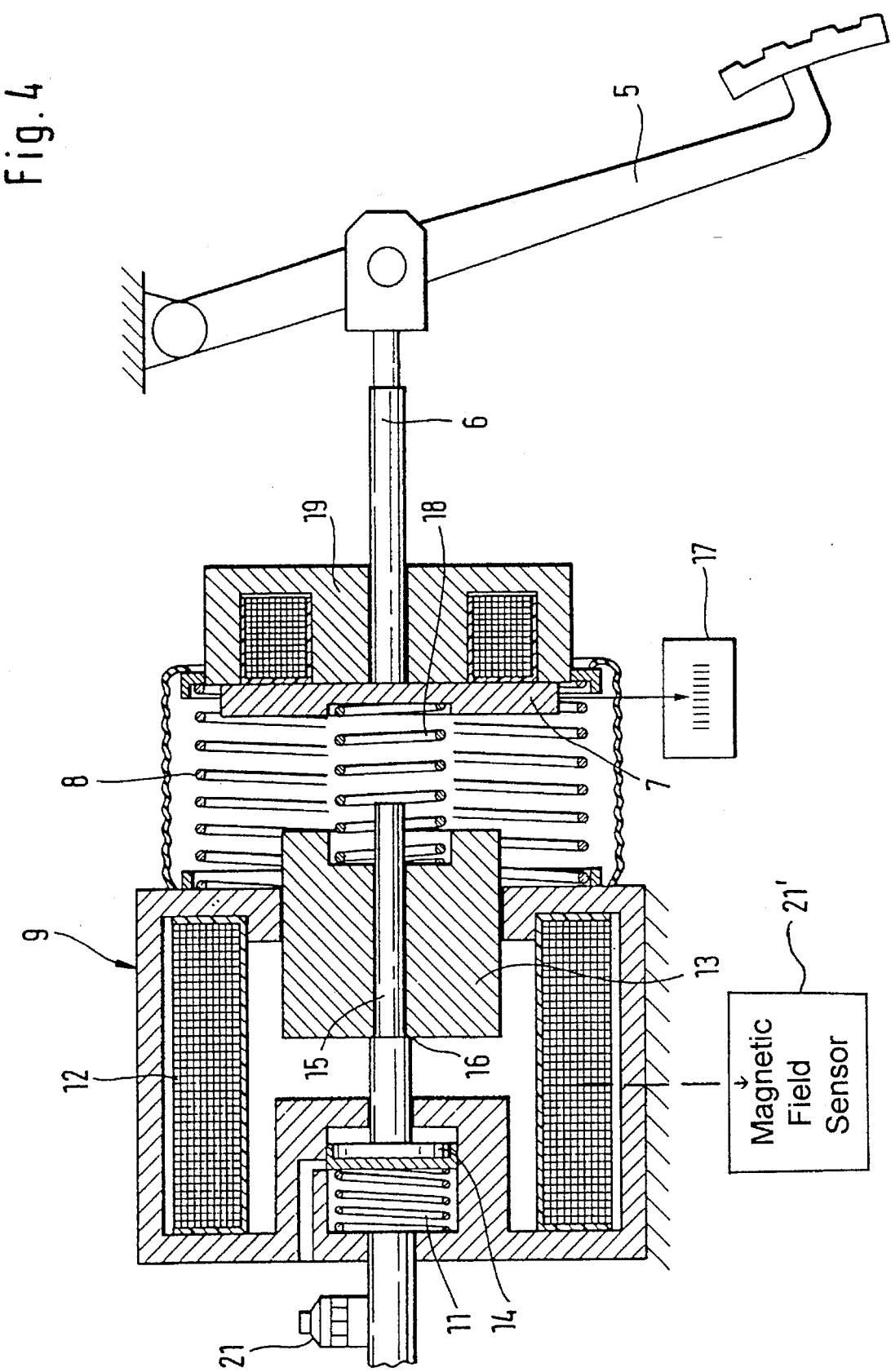
FIG. 4 is a partial cross-sectional view on an enlarged scale of a second embodiment of an actuating unit for the brake system shown in FIG. 1.

In the design variant of the actuating unit according to the present invention shown in FIG. 4, the actuating rod 6 articulated at the actuating pedal 5 carries a plate 7 which cooperates with a second electromagnet 19 which is adjacent to plate 8. The above-mentioned simulator spring 8 is clamped in between the housing of the first electromagnet 9 and the second electromagnet 19 which is arranged preferably coaxially relative to the actuating rod 6. The actuating travel of the actuating pedal 5 is determined by a travel sensor 17 sensing the movement of the plate 7. The safe abutment of the plate 7 on the second electromagnet 19 is ensured by the action of a second compression spring 18 which is supported on the armature 13 of the first electromagnet 9. Once the winding of the second electromagnet 19 is energized, e.g. by actuation of the controller 70 (FIG. 1) by the brake light switch 100, the plate 7 will be kept on the electromagnet 19 due to the electromagnetic attractive power of electromagnet 19 so that the force of the spring 8 must be overcome on actuation.

Preferably, the distance between the plate 7 and the end of the piston rod 15 displacing the master cylinder piston 14 is sized such that a mechanical transmission of the actuating force onto the piston rod 15 can take place in the event of power failure or an error detection. This mechanical transmission would occur when both the first electromagnet 9 and the second electromagnet 19 are not energized and the simulator spring 8 is uncoupled from the actuating pedal 5 in terms of effect. The pressure prevailing in the master brake cylinder 11 is sensed on actuation by a pressure sensor 21 connected thereto, while other possibilities of sensing the master cylinder can be realized as well, for instance by using a magnetic field sensor 21' to determine the magnetic field of the first electromagnet 9.

Figure 5:
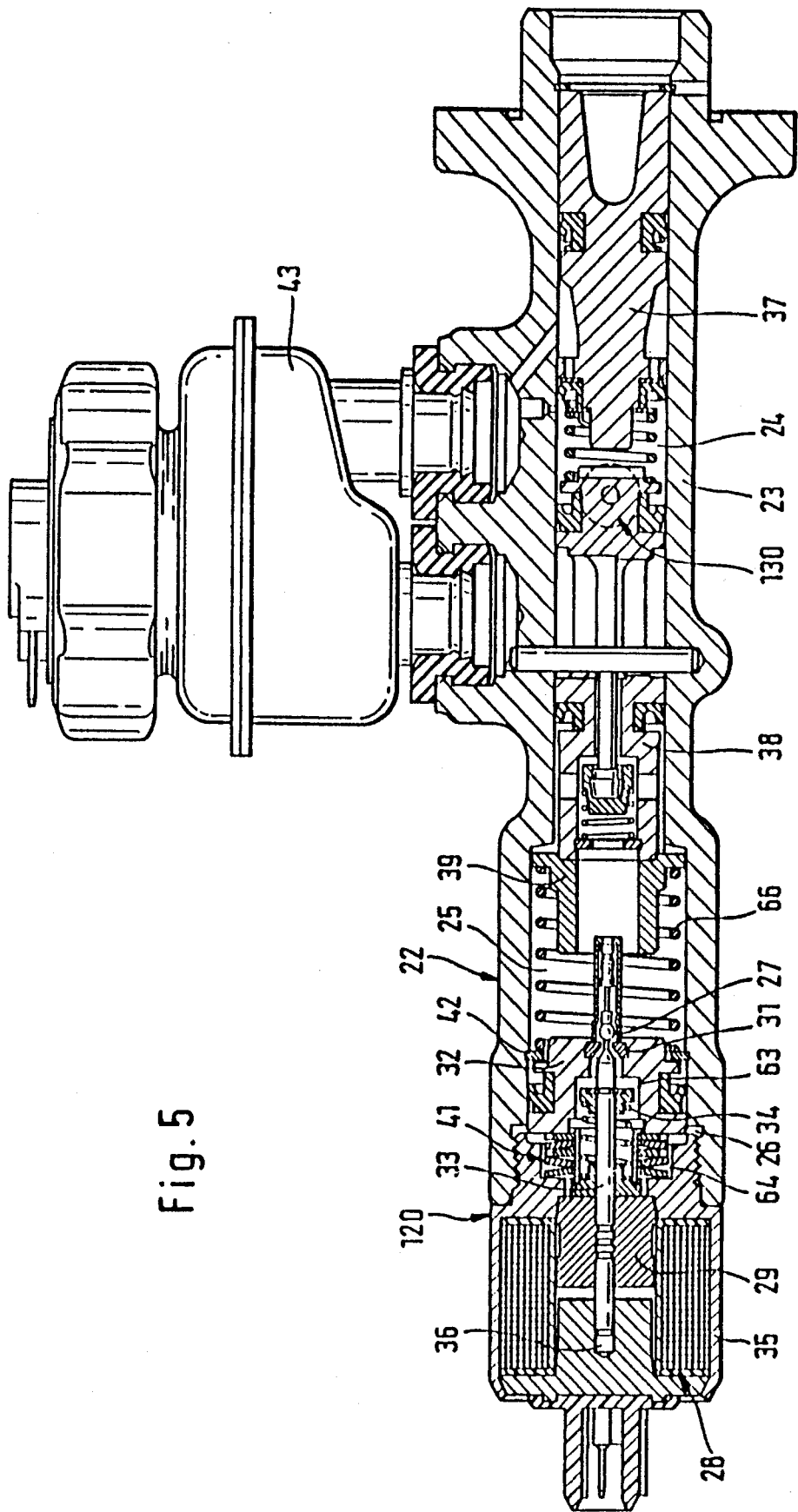
FIG. 5 is a cross-sectional view on an enlarged scale of the actuating unit of the brake system shown in FIG. 2.

The actuating unit shown in FIG. 5 is substantially composed of a master brake cylinder 22 having master cylinder housing 23. A valve assembly 120 is arranged in master cylinder housing 23. The master brake cylinder 22 includes two serially arranged master brake cylinder pistons 37, 38 that confine two pressure chambers 24, 25 which are in communication with an unpressurized pressure-fluid supply reservoir 43 via known valves. The pressure prevailing in the first pressure chamber 24 is sensed by the pressure sensor 130 (FIG. 2) which is indicated merely schematically. The second pressure chamber 25 is bounded by a hydraulic piston 32 which is axially slidable within limits and which, being in abutment on a stop 42 formed fast with the master cylinder housing, isolates the second pressure cheer 25 from another hydraulic chamber 26 to which the hydraulic friction brakes 50, 60 (FIG. 2) are connected.

The piston 32 which forms a component part of the previously mentioned valve assembly 120 is furnished with a stepped bore 63 and, at the end facing the second pressure cheer 25, a valve seat 31 which is closable by a closure member 27 formed by a ball that is resiliently biassed in the closing direction of the valve. Cooperating with the closure member 27 is a tappet 33 which is operable by an electromagnet 28. Tappet 33 is rigidly connected with the armature 29 of the electromagnet 28 and is biassed in the valve's opening direction by a spring 34 supported on the housing 35 of the electromagnet 28. The housing 35 of the electromagnet 28 includes in its rear portion a blind-end bore 36 whose length is dimensioned to be only slightly larger than the actuating stroke of the tappet 33 which can get into abutment on the bottom of the blind-end bore 36 in the event of a possible detachment of its force-transmitting connection with the armature 29. The housing 35 of the electromagnet 28 serves as an axial stop for the piston 32, bounds the hydraulic chamber 26 and accommodates in a cylindrical recess 64 a cup spring assembly 41 on which the piston 32 abuts forcelessly in the inactive position.

It is particularly favorable that the valve assembly 120, as shown in the drawing, is rotationally symmetrical and closes the bore in the master cylinder housing 23 such that its axis of symmetry is identical with that of the master cylinder 22. Namely, on failure of the second pressure chamber 25, a like arrangement permits the transmission of mechanical forces from the second master cylinder piston 38 to the piston 32 so that an exploitable pedal travel proportional to the pedal force does not get lost in the second pressure chamber 25; instead, the force resulting from this pedal travel is propagated to hydraulic chamber 26. The transmission of force preferably takes place by a cylindrical sleeve 39 which is axially abutting on the second master cylinder piston 38 and on which a piston return spring 66 takes support which biases the second master cylinder piston 38.

The following description of the operation of the inventive brake system shown in FIGS. 2 and 5 is based on an inactive condition which is illustrated in the drawing. In the inactive condition the two pressure chambers 24 and 25 as well as the hydraulic chamber 26 are unpressurized. The pressure chambers 24 and 25 are in communication with the pressure fluid supply reservoir 43, and the chamber 26 is in communication with the second pressure chamber 25 via the open valve 31, 27.

When a braking operation is initiated by actuating the actuating pedal 5, a signal generated by the brake light switch 100 causes energization of the electromagnet 28 of the valve assembly 120. With this energization, armature 29 draws the tappet 33 to the left in the drawing so that the ball 27 moves into abutment on the sealing seat 31. Thus, the connection between the second pressure chamber 25 and the chamber 26 or the hydraulic friction brakes 50, 60, respectively, is interrupted. A further pressure increase in the pressure chambers 24 and 25 has as a result that the pressure sensor 130 connected to the first pressure chamber 24 produces an output signal which is supplied to the controller 70. The control signal of the controller 70 delivered to the control device 80 causes switch-over of the electric drive motors 10, 20, 30, 40 into the braking mode during which braking of the vehicle is effected. The pressure development in the second pressure chamber 25 causes the piston 32 to displace in opposition to the cup spring assembly 41 and thereby generates a pedal travel which is proportional to the achieved braking effect. The movement of the piston 32 causes merely a pressure fluid volume to displace out of the chamber 26, from which ensues the application of the linings of the hydraulic friction brakes 50, 60 to the wheels 1, 2.

Once the pressure prevailing in the second pressure chamber 25 exceeds a predetermined value, for instance 40 bar, the piston 32 reaches the tappet 33 positioned by the electromagnet 28. At this point, the ball 27 is pushed open, and the connection between the second pressure chamber 25 and the chamber 26 is opened.

As a result, the pressure prevailing in the chamber 26 is increased which, on the one hand, operates the hydraulic brakes 50, 60 and, on the other hand, in coaction with the cup spring assembly 41, returns the piston 32 until the control valve 31, 27 has closed again. Upon power failure, the spring force of the compression spring 34 in any position causes the sealing seat 31 to open and thus establishes a connection between the second pressure chamber 25 and the hydraulic chamber 26.

What is claimed:

1. A brake system for automotive vehicles with electric drive which is operable by an actuating pedal cooperating with an actuating rod, comprising at least one electric drive motor and hydraulic friction brakes which are connected to a master brake cylinder, means for determining a pressure prevailing in the master brake cylinder, a first control device to which the output signal of a sensor for determining the actuating condition of the actuating pedal is fed, and a second control device, responsive to said first control device, for controlling the electric drive motor, characterized in that the actuating pedal is in force-transmitting/travel-transmitting connection with a spring having a predefinable characteristic curve, and in that the master brake cylinder, uncoupled from the actuating pedal, is operable by an electromagnet drivable by the first control device.

2. A brake system as claimed in claim 1, characterized in that the electromagnet is arranged coaxially to the master brake cylinder such that its armature radially embraces a piston rod operating the master cylinder piston and is axially abutting on a collar of larger diameter provided thereon.

3. A brake system as claimed in claim 2, characterized in that the spring is arranged such that it can be uncoupled from the actuating pedal in terms of effect.

4. A brake system as claimed in claim 3, characterized in that the actuating rod carries a plate that cooperates with a second electromagnet which can be driven on actuation and on which the spring takes support.

5. A brake system as claimed in claim 4, characterized in that the sensor for determining the actuating position of said actuating pedal is a brake light switch cooperating with the actuating pedal and the second electromagnet can be driven by the controller or by the brake light.

6. A brake system as claimed in claim 4, characterized in that the plate is movable into engagement with the piston rod.

7. A brake system as claimed in claim 4, characterized in that a second spring is interposed between the armature of the electromagnet and the plate.

8. A brake system as claimed in claim 3, the master brake cylinder being provided with a pressure fluid supply reservoir, characterized in that the electromagnet is arranged so as to be axially slidable within limits and cooperates with a hydraulic piston which confines a hydraulic chamber, the connection of which with the pressure fluid supply reservoir can be shut off on actuation, and in that the spring is supported on the electromagnet.

9. A brake system as claimed in claim 8, characterized in that the piston is designed as an annular piston and bounds the chamber designed as an annular chamber in a flange adapted to be fitted preferably to a body wall of the automotive vehicle, in which flange a valve is arranged which is preferably open in its de-energized state and shuts off the annular chamber.

10. A brake system as claimed in claim 9, characterized in that the sensor for determining the actuating condition of the actuating pedal is a brake light switch cooperating with the actuating pedal and the valve can be driven by the first controller or by the brake light switch cooperating with the actuating pedal.

11. A brake system as claimed in claim 10, characterized in that the master cylinder housing is made of plastics and is designed integrally with the pressure fluid supply reservoir.

12. A brake system as claimed in claim 11, characterized in that the connection between the annular chamber and the pressure fluid supply reservoir is formed by two bores provided in the flange as well as by a tubular pressure fluid duct which is shaped at the pressure fluid supply reservoir and connects to one of the bores.

13. A brake system as claimed in claim 12, characterized in that the master brake cylinder is coupled to the flange by the intermediary of the automobile body wall.

14. A brake system as claimed in claim 13, characterized in that the flange and the electromagnet form an assembly unit which carries the first control device.

15. A brake system as claimed in claim 14, characterized in that the master cylinder piston is designed as a plunger piston and is slidably guided in a sliding guide arranged in the master cylinder housing.

16. A brake system as claimed in claim 15, characterized in that the sliding guide serves as an axial stop for the master cylinder piston, on the one hand, and as an abutment surface for a resetting spring biasing the master cylinder piston, on the other hand.

17. A brake system as claimed in claim 15, characterized in that the sliding guide is designed as a sleeve provided with an external thread which is screwed into the master cylinder housing.

18. A brake system as claimed in claim 17, characterized in that the actuating rod is movable into engagement with a piston rod actuating the master cylinder piston.

19. A brake system as claimed in claim 18, characterized in that a device for sensing the switch condition of the valve is provided.

20. A brake system as claimed in claim 19, characterized in that the valve is designed as a solenoid valve, the device sensing variations of the inductivity of its coil which are caused by variations of the switch condition of the valve.

21. A brake system as claimed in claim 20, characterized in that the sensor for determining the actuating condition of the actuating pedal is a pressure sensor which is connected to the hydraulic chamber.

22. A brake system as claimed in claim 21, characterized in that the master brake cylinder is designed as a tandem master cylinder.

23. A brake system as claimed in claim 1, characterized in that the actuating rod carries a plate on which the spring is supported.

24. A brake system as claimed in claim 1, characterized in that the means for determining the pressure prevailing in the master brake cylinder is a pressure sensor.

25. A brake system as claimed in claim 1, characterized in that the means for determining the pressure prevailing in the master brake cylinder is a magnetic field sensor sensing the magnetic field of the electromagnet.

26. A brake system for automotive vehicles having electric drive comprising:

an actuating pedal;

an actuating rod coupled to said actuating pedal and movable in response to said actuating pedal;

a plurality of vehicle wheels;

at least one electric drive motor for driving and braking said plurality of vehicle wheels;

a master brake cylinder having a master brake cylinder piston which is uncoupled from the actuating pedal until said actuating pedal has travelled a threshold distance;

a plurality of hydraulic friction brakes connected to said master brake cylinder and individually associated with said plurality of vehicle wheels for braking said plurality of vehicle wheels;

means for determining a pressure prevailing in said master brake cylinder;

a sensor for determining the actuating position of said actuating pedal and for generating actuating pedal position signals;

a first control device responsive to said actuating pedal position signals for generating first control signals;

a first electromagnet responsive to said first control device for actuating said master brake cylinder piston;

a second control device responsive to said first control signals for generating second control signals to control said at least one electric drive motor; and a spring, coupled to said actuating pedal, having a predetermined characteristic curve for simulating a reaction force caused by hydraulic braking to said actuating pedal.

27. A brake system as claimed in claim 26, further comprising:

a piston rod coupled to said master brake cylinder piston for actuating said master brake cylinder piston having a collar of larger diameter;

an armature, movable in response to said first electromagnet, radially embracing said piston rod and axially abutting on said collar; and wherein said first electromagnet is arranged coaxially with said master brake cylinder.

28. A brake system as claimed in claim 27, further comprising a plate carried by said actuating rod and on which said spring is supported.

29. A brake system as claimed in claim 28, wherein said plate is movable into engagement with said piston rod.

30. A brake system as claimed in claim 28, further comprising a second spring interposed between said armature and said plate.

31. A brake system as claimed in claim 27, wherein said first electromagnet is axially slidable within limits and and said spring is supported on said first electromagnet and further comprising:

a pressure fluid supply reservoir formed with said master brake cylinder for supplying pressure fluid;

a hydraulic piston which confines a hydraulic chamber in pressure fluid communication with said pressure fluid supply reservoir; and means for selectively preventing pressure fluid flow between said hydraulic chamber and said pressure fluid supply reservoir on actuation of said actuation pedal during electric braking.

32. A brake system as claimed in claim 31, further comprising a flange adapted to be fitted to a body wall of the automotive vehicle and wherein:

said hydraulic piston is an annular piston;

said hydraulic chamber is an annular chamber; and said means for preventing pressure fluid flow are a valve arranged in said flange which is open in its de-energized state.

33. A brake system as claimed in claim 32, wherein said valve responds to said first control device.

34. A brake system as claimed in claim 33, wherein said flange and said electromagnet form an assembly unit which carries said first control device.

35. A brake system as claimed in claim 33, further comprising a device for sensing the switch condition of said valve.

36. A brake system as claimed in claim 35, wherein said valve is a solenoid valve having a coil with an inductivity which is variable dependent on the switch position of said valve, and said device senses variations of the inductivity of the coil.

37. A brake system as claimed in claim 36, wherein said sensor for determining the actuating position of said actuating pedal is a pressure sensor which is connected to said hydraulic chamber.

38. A brake system as claimed in claim 32, wherein:

said sensor for determining the actuating position of said actuating pedal is a brake light switch responsive to said actuating pedal; and said valve responds to said brake light switch responsive.

39. A brake system as claimed in claim 32, wherein said master brake cylinder is defined by a master brake cylinder housing which is made of plastic and is designed integrally with said pressure fluid supply reservoir.

40. A brake system as claimed in claim 39, wherein said master brake cylinder piston is designed as a plunger piston and further comprising a sliding guide arranged in the master cylinder housing in which said master brake cylinder piston is slidably guided.

41. A brake system as claimed in claim 40, further comprising a resetting spring for biasing the master brake cylinder piston and wherein said sliding guide serves as an axial stop for said master brake cylinder piston and as an abutment surface for said resetting spring.

42. A brake system as claimed in claim 40, wherein said sliding guide is designed as a sleeve provided with an external thread which is screwed into said master cylinder housing.

43. A brake system as claimed in claim 42, wherein said actuating rod is movable into engagement with said piston rod.

44. A brake system as claimed in claim 32, wherein the connection between said annular chamber and said pressure fluid supply reservoir is formed by two bores provided in said flange and by a tubular pressure fluid duct which is shaped at the pressure fluid supply reservoir and connects to one of the bores.

45. A brake system as claimed in claim 32, wherein said master brake cylinder housing is coupled to said flange by the body wall of the automotive vehicle.

46. A brake system as claimed in claim 26, further comprising:

a plate carried by said actuating rod and on which said spring is supported; and a second electromagnet adjacent said plate.

47. A brake system as claimed in claim 46, wherein said sensor for determining the actuating position of said actuating pedal is a brake light switch responsive to said actuating pedal, and wherein said second electromagnet responds to said first control device.

48. A brake system as claimed in claim 26 wherein said master brake cylinder is designed as a tandem master cylinder.

49. A brake system as claimed in claim 26, wherein said means for determining a pressure prevailing in said master brake cylinder are a pressure sensor.

50. A brake system as claimed in claim 26, wherein said means for determining a pressure prevailing in said master brake cylinder are a magnetic field sensor for sensing the magnetic field of said first electromagnet.

* * * * *

UNITED STATES PATENT AND TRADE MARK OFFICE
CERTIFICATE OF CORRECTION

PATENT NO. : 5,551,764
DATED : September 3, 1996
INVENTOR(S) : Dieter Kircher et al.

It is certified that error appears in the above-identified patent and that said Letters Patent is hereby corrected as shown below:

In item [57]/Abstract on the cover page, in line 14, after "pressure" delete "cheers" and substitute therefor --chambers--

In Column 7, lines 35 and 36, delete "using a magnetic field sensor 21' to determine" and substitute therefor --determining--

In Column 11, line 39, claim 31, delete "and" (second occurrence)

In Column 12, line 15, claim 38, after "switch" delete "responsive"

Signed and Sealed this

Third Day of February, 1998

BRUCE LEHMAN

Attest:

Attesting Officer

Commissioner of Patents and Trademarks